US012693701B2

(12) United States Patent
Wei et al.

(10) Patent No.: US 12,693,701 B2
(45) Date of Patent: Jul. 28, 2026

(54) SYNCHRONIZATION METHOD AND CLIENT

(71) Applicant: Nanning FuLian FuGui Precision Industrial Co., Ltd., Nanning (CN)

(72) Inventors: Sheng-Xiong Wei, Nanning (CN); Zi-Hang Zeng, Nanning (CN)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 68 days.

(21) Appl. No.: 18/812,207

(22) Filed: Aug. 22, 2024

(65) Prior Publication Data

US 2026/0016853 A1 Jan. 15, 2026

(30) Foreign Application Priority Data

Jul. 9, 2024 (CN) .......................... 202410917570.0

(51) Int. Cl.
*G06F 1/12* (2006.01)
*G06F 1/14* (2006.01)

(52) U.S. Cl.
CPC . *G06F 1/12* (2013.01); *G06F 1/14* (2013.01)

(58) Field of Classification Search
CPC ..................................... G06F 1/12; G06F 1/14
See application file for complete search history.

(56) References Cited

U.S. PATENT DOCUMENTS

| | | | | |
|---|---|---|---|---|
| 5,274,545 A | * | 12/1993 | Allan | ..................... G04G 3/00 |
| | | | | 368/200 |
| 7,324,559 B2 | * | 1/2008 | McGibney | ............ H04J 3/0605 |
| | | | | 455/462 |
| 7,921,317 B2 | * | 4/2011 | Malek | ...................... G06F 1/12 |
| | | | | 713/401 |
| 9,596,073 B1 | * | 3/2017 | Reyes | .................. G01R 25/00 |
| 10,206,192 B2 | * | 2/2019 | Kim | ...................... H04L 5/0007 |
| 10,404,447 B1 | * | 9/2019 | Haddad | ................. H03L 7/0807 |
| 10,797,805 B1 | * | 10/2020 | Mirfakhraei | ........... G06N 3/084 |
| 2002/0142779 A1 | * | 10/2002 | Goto | ..................... H04W 72/02 |
| | | | | 455/450 |
| 2006/0038719 A1 | * | 2/2006 | Pande | ..................... G01S 19/46 |
| | | | | 342/357.64 |

(Continued)

FOREIGN PATENT DOCUMENTS

| | | | | | |
|---|---|---|---|---|---|
| CN | 105577348 A | * | 5/2016 | ............... | H04L 7/00 |
| CN | 113422748 B | * | 7/2022 | ......... | H04L 27/2671 |

(Continued)

*Primary Examiner* — Faisal M Zaman
(74) *Attorney, Agent, or Firm* — ScienBiziP, P.C.

(57) ABSTRACT

In a synchronization method applied to a client, synchronization information between the client and a server is periodically acquired; a preset number of sample data is selected from the synchronization information; time $T_c$ required by a CPU to process the sample data is recorded; a time offset prediction value and a frequency offset prediction value at time $T_n$ are predicted by means of substituting the sample data into a preset formula; and a current frequency and time of the client is restored according to the time offset prediction value, the frequency offset prediction value and the time $T_c$ when a synchronization source is lost.

12 Claims, 3 Drawing Sheets

(56)                References Cited

U.S. PATENT DOCUMENTS

| | | | | |
|---|---|---|---|---|
| 2007/0280098 | A1* | 12/2007 | Bhatt | H04L 27/2656 370/208 |
| 2009/0041053 | A1* | 2/2009 | Birmiwal | H04N 21/43072 370/468 |
| 2010/0020909 | A1* | 1/2010 | Jung | H04J 3/0667 375/371 |
| 2010/0058095 | A1 | 3/2010 | Malek | |
| 2010/0222001 | A1* | 9/2010 | Sangary | H04B 17/309 455/42 |
| 2011/0216865 | A1* | 9/2011 | Qi | H04L 27/2675 375/371 |
| 2012/0110138 | A1* | 5/2012 | Zhang | H04L 67/02 709/219 |
| 2013/0223524 | A1* | 8/2013 | Lu | H04N 19/58 375/E7.243 |
| 2016/0170440 | A1* | 6/2016 | Aweya | G06F 1/10 713/503 |
| 2016/0359575 | A1* | 12/2016 | Ito | H04L 69/28 |
| 2017/0117980 | A1* | 4/2017 | Cheng | H04J 3/0697 |
| 2019/0081720 | A1* | 3/2019 | Barry | H04W 56/0015 |
| 2019/0260490 | A1* | 8/2019 | Lv | H04J 3/067 |
| 2020/0019208 | A1* | 1/2020 | You | H04L 7/02 |
| 2020/0033909 | A1* | 1/2020 | Rupert | G06F 1/10 |
| 2021/0289255 | A1* | 9/2021 | Balint | H04N 21/812 |
| 2021/0294378 | A1* | 9/2021 | Rabinovich | H04J 3/0667 |
| 2022/0094488 | A1* | 3/2022 | Matsumura | H04L 5/0032 |
| 2023/0315025 | A1* | 10/2023 | Castle | G01S 19/256 368/47 |
| 2024/0171185 | A1* | 5/2024 | Huang | H03L 7/195 |
| 2024/0372768 | A1* | 11/2024 | Zhao | H04L 27/26 |
| 2026/0016853 | A1* | 1/2026 | Wei | G06F 1/12 |

FOREIGN PATENT DOCUMENTS

| | | |
|---|---|---|
| CN | 116359605 A | 6/2023 |
| CN | 116736299 A | 9/2023 |

* cited by examiner

SYNCHRONIZATION METHOD AND CLIENT

CROSS-REFERENCE TO RELATED APPLICATIONS

This application claims priority to Chinese Patent Application No. 202410917570.0 filed on Jul. 9, 2024, in China National Intellectual Property Administration, the contents of which are incorporated by reference herein.

FIELD

The subject matter herein generally relates to synchronization technology, in particular to a synchronization method and a client.

BACKGROUND

Synchronization is calculating path offset and time offset between master clocks and slave clocks by recording time-stamps generated when event messages are exchanged between master clock devices and slave clock devices, for realizing time and frequency synchronization between the master clock devices and the slave clock devices. When synchronization source is lost, there is no guarantee that a client can still maintain time accuracy. In addition, future time and frequency offsets cannot be predicted through historical synchronization information in existing technologies.

BRIEF DESCRIPTION OF THE DRAWINGS

Implementations of the present technology will now be described, by way of example only, with reference to the attached figures, wherein.

DETAILED DESCRIPTION

Figure 1:
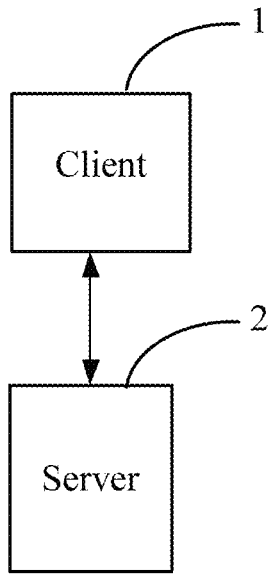
FIG. 1 is an operating environment diagram of a client according to a preferred embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure. References to "an" or "one" embodiment in this disclosure are not necessarily to the same embodiment, and such references mean "at least one".

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

FIG. 1 is an operating environment diagram of a client 1 according to a preferred embodiment of the present disclosure. The client 1 communicates with a server 2.

Figure 2:
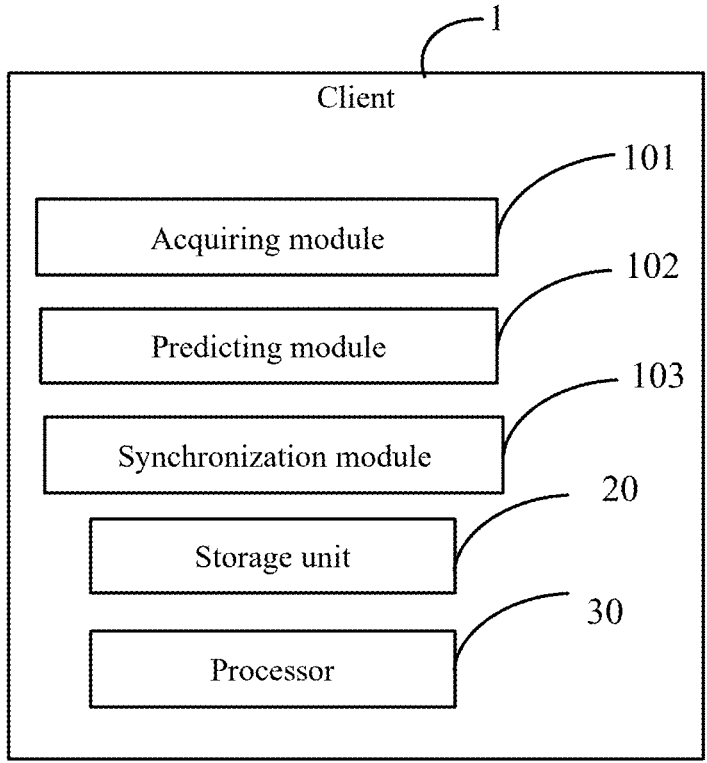
FIG. 2 illustrates a program module diagram of the client according to a preferred embodiment of the present disclosure.

FIG. 2 illustrates a program module diagram of the client 1 according to a preferred embodiment of the present disclosure.

The client 1 includes an acquiring module 101, a predicting module 102 and a synchronization module 103. The client 1 further includes a storage unit 20, and a processor 30. The modules are configured to be executed by one or more processors (in the in the preferred embodiment, a number of the one or more processors 30 is one). The modules referred to are computer program segments that perform specific instructions. The storage unit 20 is used to store program code and other data of the client 1. The processor 30 is used to execute the program code stored in the storage unit 20.

The storage unit 20 includes at least one type of readable storage medium, the readable storage medium includes a flash memory, a hard disk, a multimedia card, a card-type memory (for example, SD or DX memory, etc.), a random access memory (RAM), a static random access memory (SRAM), a read only memory (ROM), an electrically erasable programmable read only memory (EEPROM), a programmable read only memory (PROM), a magnetic memory, a magnetic disk, an optical disk, and other components. The processor 30 may be a central processing unit (CPU), a controller, a microcontroller, a microprocessor, or other data processing chip.

The acquiring module 101 periodically acquires synchronization information between the client 1 and the server 2.

In the embodiment, when the network is not interrupted, a frequency offset and a time offset between the client 1 and the server 2 are calculated by a timestamp generated when a message is exchanged between the client 1 and the server 2. The client 1 performs time and frequency synchronization according to the frequency offset and the time offset, thereby achieving time and frequency synchronization between the client 1 and the server 2. In the embodiment, an acquiring period is set according to actual needs, for example, once every 1 second or 2 seconds. The synchronization information includes time synchronization information and frequency synchronization information, more specifically, the synchronization information includes a time offset value and a frequency offset value.

The acquiring module 101 further selects a preset number of sample data from the synchronization information.

Specifically, the acquiring module 101 obtains load information of a CPU of the client 1, and determines a load level of the CPU according to the load information; and selects a corresponding amount of sample data according to the load level. Different levels correspond to different amounts of sample data. A CPU load is the CPU usage rate, for example, 30%, 60%, 90%, and so on. For example, the CPU usage rate may be obtained through the Top command in the Linux system. In the embodiment, when the CPU usage rate is higher, a smaller number of sample data is selected. The CPU load is divided into three levels according to the CPU usage rate. High CPU usage rate is corresponding to high level, and low CPU usage rate is corresponding to low level. The higher the CPU load level is, the fewer sample data are selected. For example, when the CPU load is at a high level, the number of samples is 10, when the CPU load is at a medium level, the number of samples is 20, and when the CPU load is at a low level, the number of samples is 30. Of course, in the embodiment, the preset number is not limited, which can be set by the developer as required.

The acquiring module 101 further records time $T_c$ required by a CPU to process the sample data.

The client 1 further includes a timer, and the timer is used for recording the time $T_c$ required by the CPU to process the sample data. In network communication, data transmission time reaches nanosecond (ns) level. Therefore, in the embodiment, the time $T_c$ required by the CPU to process the sample data is also recorded. Taking $T_c$ into consideration when making synchronization predictions, the synchronization accuracy between the client 1 and the server 2 will be increased.

The predicting module 102 predicts a time offset prediction value and a frequency offset prediction value at time $T_n$ by means of substituting the sample data into a preset formula.

The predicting module 102 performs a first weighted average calculation on the sample data according to a formula $S_n = a*y_n + (1-a)*S_{n-1}$ to obtain the time offset prediction value and the frequency offset prediction value at the time $T_n$, and performs a second weighted average calculation according to a formula $$S'_n = a^* S_n + (1 - a)^* S'_{n-1}$$

on the time offset prediction value and the frequency offset prediction value obtained by the first weighted average calculation, and regards values obtained by second weighted average calculation as a final time offset prediction value and a final frequency offset prediction value at the time $T_n$.

When the preset formula is calculated for the time offset prediction value, $S_0$ is an average value of time offset values in n sample data, $S_n$ is the time offset prediction value at the time $T_n$ obtained by the first weighted average calculation, in nanoseconds, a is a weighting coefficient value, which is a constant, $y_n$ is a time offset value in the sample data at the time $T_n$, $$S'_n$$

is the time offset prediction value at the time $T_n$ obtained by the second weighted average calculation, in nanoseconds; and when the preset formula is calculated for the frequency offset prediction value, $S_0$ is an average value of frequency offset values in n sample data, $S_n$ is the frequency offset prediction value at the time $T_n$ obtained by the first weighted average calculation, a is the weighting coefficient value, which is a constant, $y_n$ is a frequency offset value in the sample data at the time $T_n$, $$S'_n$$

is the frequency offset prediction value at the time $T_n$ obtained by the second weighted average calculation, in nanoseconds.

The step of calculating the weighting coefficient value a includes: calculating a speed of current frequency change of the client 1 by using a linear regression algorithm according to the sample data, and selecting size of the weighting coefficient value a according to the speed of the current frequency change. When the current frequency changes faster, a larger weighting coefficient value a is selected, and when the current frequency changes slower, a smaller weighting coefficient value a is selected.

The speed of frequency change is the slope b of a straight line about the relationship between the time offset and the frequency offset of the sample data placed in a coordinate system, wherein the time offset is the x-axis and the frequency offset is the y-axis. The frequency change reflects the current synchronization status of the client 1 and the server 2 to a certain extent. In the embodiment, the speed of the frequency change is used as one of the factors for predicting the future synchronization status.

For example, the following Table 1 shows the relationship between the slope b and the weighting coefficient value a. Of course, the present application is not limited to the following values.

TABLE 1

| Slope b | 0 < b < 30° | 30° < b < 60° | 60° < b < 90° |
|---|---|---|---|
| weighting coefficient value a | 0.2 | 0.4 | 0.8 |

The following example is used to illustrate the above calculation (in the following embodiment, 4 sample data are taken):

TABLE 2

| Time | T1 | T2 | T3 | T4 | $T_n$ |
|---|---|---|---|---|---|
| Time offset value | 35 ns | 48 ns | 54 ns | 49 ns | ? |
| Frequency offset value | 0.026 ppm | 0.023 ppm | 0.029 ppm | 0.18 m | ? |

In the above Table 2, four sample data (time offset value and frequency offset value) are taken at time T1-T4. A secondary weighted average calculation is performed to predict the time offset value and frequency offset value at time $T_n$ in the future. Herein a=0.2 is taken as an example for calculation. Below the time offset value is taken as an example for calculation:

$$S_0 = (T1 + T2 + T3 + T4)/n = (35 + 48 + 54 + 49)/4 = 46.5$$

$$S_1 = a*y1 + (1 - a)*S0 = 0.2*35 + (1 - 0.2)*46.5 = 44.2$$

-continued $$S_2 = a * y2 + (1 - a) * S1 = 0.2 * 48 + (1 - 0.2) * 44.2 = 44.96$$

$$S_3 = a * y3 + (1 - a) * S2 = 0.2 * 54 + (1 - 0.2) * 44.96 = 46.768$$

$$S_4 = a * y4 + (1 - a) * S3 = 0.2 * 49 + (1 - 0.2) * 46.768 = 47.214$$

After the first weighted average calculation using the formula $S_n = a * y_n + (1-a) * S_{n-1}$, the time offset prediction value at time $T_n$ is: 47.214 ns. When a=0.4, the time offset prediction value at time $T_n$ after the first weighted average calculation is: 48.522 ns, and when a=0.6, the time offset prediction value at time $T_n$ after the first weighted average calculation is: 49.502 ns.

In order to make the data more accurate, the time offset prediction value of the first weighted average calculation is performed the second weighted average calculation according to the formula $S_n' = a * S_n + (1-a) * S_{n-1}'$:

$$S1' = a * S1 + (1 - a) * S0' = 0.2 * 44.2 + (1 - 0.2) * 45.786 = 45.469$$

$$S2' = a * S2 + (1 - a) * S1' = 0.2 * 44.96 + (1 - 0.2) * 45.469 = 45.367$$

$$S3' = a * S3 + (1 - a) * S2' = 0.2 * 46.768 + (1 - 0.2) * 45.367 = 45.647$$

$$S4' = a * S4 + (1 - a) * S3' = 0.2 * 47.214 + (1 - 0.2) * 45.647 = 45.961$$

The time offset prediction value at time $T_n$ after the second weighted average calculation is: 45.961 ns. The details are shown in Table 3:

TABLE 3

| Time | T1 | T2 | T3 | T4 | $T_n$ |
|---|---|---|---|---|---|
| Time offset value | 35 ns | 48 ns | 54 ns | 49 ns | ? |
| Time offset value after the first weighted average calculation | 46.5 | 44.2 | 44.96 | 46.768 | 47.214 |
| Time offset value after the second weighted average calculation | 45.786 | 45.469 | 45.367 | 45.647 | 45.961 |

The frequency offset prediction value is calculated using the same algorithm as above, which will not be described in detail here.

The synchronization module 103 restores current frequency and time of the client according to the time offset prediction value, the frequency offset prediction value and the time $T_c$ when synchronization source is lost.

Specifically, the synchronization module 103 determines the synchronization source to be lost when the client 1 does not receive synchronization information from the server 2. In a preferred embodiment, when the current synchronization source is not lost but the network signal is very poor, the current frequency and time of the client are restored according to the prediction information.

Specifically, the synchronization module 103 restores current frequency and time according to the time offset prediction value, the frequency offset prediction value and the time $T_c$, at the same time sends the time offset prediction value, the frequency offset prediction value and the time $T_c$ to the server 2 with a timestamp.

In the embodiment, by predicting future time offset and frequency offset through historical synchronization information, it can be ensured that the client can still perform synchronization through the predicted time offset and frequency offset to maintain time accuracy when the synchronization source is lost.

Figure 3:
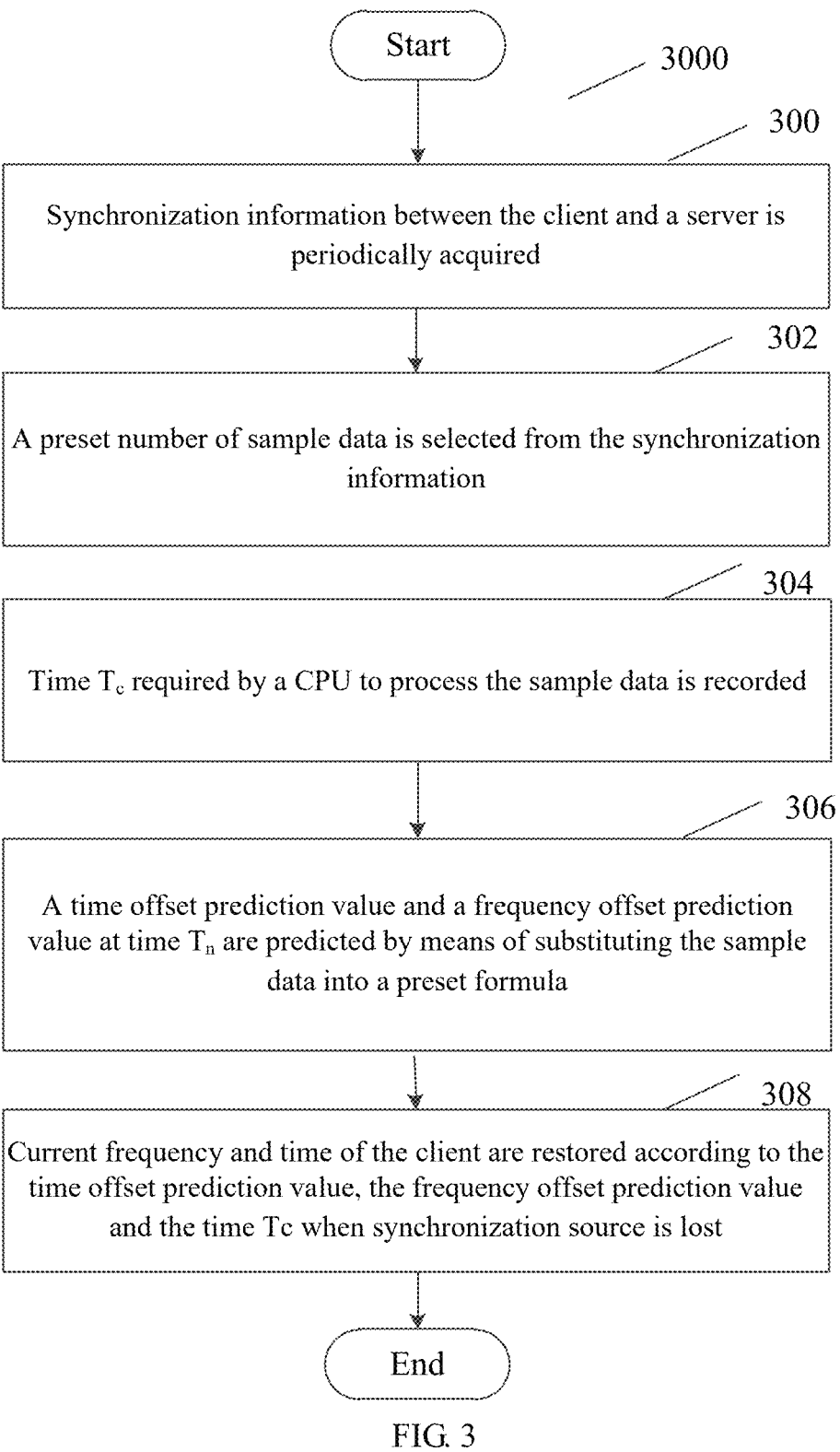
FIG. 3 is a flow chart of a synchronization method according to a preferred embodiment of the present disclosure.

FIG. 3 illustrates a flowchart presented in accordance with an embodiment of a synchronization method 3000. Each block shown in FIG. 3 represents one or more processes, methods, or subroutines, carried out in the exemplary method 3000. Additionally, the illustrated order of blocks is by example only and the order of the blocks can be changed. The method 3000 can begin at block 300.

At block 300, synchronization information between the client and a server is periodically acquired.

In the embodiment, when the network is not interrupted, a frequency offset and a time offset between the client 1 and the server 2 are calculated by a timestamp generated when a message is exchanged between the client 1 and the server 2. The client 1 performs time and frequency synchronization according to the frequency offset and the time offset, thereby achieving time and frequency synchronization between the client 1 and the server 2. In the embodiment, an acquiring period is set according to actual needs, for example, once every 1 second or 2 seconds. The synchronization information includes time synchronization information and frequency synchronization information, more specifically, the synchronization information includes a time offset value and a frequency offset value.

At block 302, a preset number of sample data is selected from the synchronization information.

Specifically, in block 302: load information of a CPU of the client is obtained, and a load level of the CPU is determined according to the load information; and a corresponding amount of sample data is selected according to the load level, wherein different levels correspond to different amounts of sample data. A CPU load is the CPU usage rate, for example, 30%, 60%, 90%, and so on. For example, the CPU usage rate may be obtained through the Top command in the Linux system. In the embodiment, when the CPU usage rate is higher, a smaller number of sample data is selected. The CPU load is divided into three levels according to the CPU usage rate. High CPU usage rate is corresponding to high level, and low CPU usage rate is corresponding to low level. The higher the CPU load level is, the fewer sample data are selected. For example, when the CPU load is at a high level, the number of samples is 10, when the CPU load is at a medium level, the number of samples is 20, and when the CPU load is at a low level, the number of samples is 30. Of course, in the embodiment, the preset number is not limited, which can be set by the developer as required.

At block 304, time $T_c$ required by a CPU to process the sample data is recorded.

The client includes a timer, and the timer is used for recording the time $T_c$ required by the CPU to process the sample data. In network communication, data transmission time reaches nanosecond (ns) level. Therefore, in the embodiment, the time $T_c$ required by the CPU to process the sample data is also recorded. Taking $T_c$ into consideration when making synchronization predictions, the synchronization accuracy between the client 1 and the server 2 will be increased.

At block 306, a time offset prediction value and a frequency offset prediction value at time $T_n$ are predicted by means of substituting the sample data into a preset formula.

In block 306, a first weighted average calculation is performed on the sample data according to a formula $S_n = a * y_n + (1-a) * S_{n-1}$ to obtain the time offset prediction value and the frequency offset prediction value at the time $T_n$, and a second weighted average calculation is performed according to a formula $S_n' = a * S_n + (1-a) * S_{n-1}'$ on the time offset prediction value and the frequency offset prediction value obtained by the first weighted average calculation, and regarding values obtained by second weighted average calculation as a final time offset prediction value and a final frequency offset prediction value at the time $T_n$.

Wherein, when the preset formula is calculated for the time offset prediction value, $S_0$ is an average value of time offset values in n sample data, $S_n$ is the time offset prediction value at the time $T_n$ obtained by the first weighted average calculation, in nanoseconds, a is a weighting coefficient value, which is a constant, $y_n$ is a time offset value in the sample data at the time $T_n$, $S_n'$ is the time offset prediction value at the time $T_n$ obtained by the second weighted average calculation, in nanoseconds; and when the preset formula is calculated for the frequency offset prediction value, S0 is an average value of frequency offset values in n sample data, $S_n$ is the frequency offset prediction value at the time $T_n$ obtained by the first weighted average calculation, a is the weighting coefficient value, which is a constant, $y_n$ is a frequency offset value in the sample data at the time $T_n$, $S_n'$ is the frequency offset prediction value at the time $T_n$ obtained by the second weighted average calculation, in nanoseconds.

The step of calculating the weighting coefficient value a includes: calculating a speed of current frequency change of the client 1 by using a linear regression algorithm according to the sample data, and selecting size of the weighting coefficient value a according to the speed of the current frequency change. When the current frequency changes faster, a larger weighting coefficient value a is selected, and when the current frequency changes slower, a smaller weighting coefficient value a is selected.

The speed of frequency change is the slope b of a straight line about the relationship between the time offset and the frequency offset of the sample data placed in a coordinate system, wherein the time offset is the x-axis and the frequency offset is the y-axis. The frequency change reflects the current synchronization status of the client 1 and the server 2 to a certain extent. In the embodiment, the speed of the frequency change is used as one of the factors for predicting the future synchronization status.

For example, the following Table 1 shows the relationship between the slope b and the weighting coefficient value a. Of course, the present application is not limited to the following values.

TABLE 1

| Slope b | 0 < b < 30° | 30° < b < 60° | 60° < b < 90° |
|---|---|---|---|
| weighting coefficient value a | 0.2 | 0.4 | 0.8 |

The following example is used to illustrate the above calculation (in the following embodiment, 4 sample data are taken):

TABLE 2

| Time | T1 | T2 | T3 | T4 | $T_n$ |
|---|---|---|---|---|---|
| Time offset value | 35 ns | 48 ns | 54 ns | 49 ns | ? |
| Frequency offset value | 0.026 ppm | 0.023 ppm | 0.029 ppm | 0.19 m | ? |

In the above Table 2, four sample data (time offset value and frequency offset value) are taken at time T1-T4. A secondary weighted average calculation is performed to predict the time offset value and frequency offset value at time $T_n$ in the future. Herein a=0.2 is taken as an example for calculation. Below the time offset value is taken as an example for calculation:

$$S_0 = (T1 + T2 + T3 + T4)/n = (35 + 48 + 54 + 49)/4 = 46.5$$

$$S_1 = a*y1 + (1 - a)*S0 = 0.2*35 + (1 - 0.2)*46.5 = 44.2$$

$$S_2 = a*y2 + (1 - a)*S1 = 0.2*48 + (1 - 0.2)*44.2 = 44.96$$

$$S_3 = a*y3 + (1 - a)*S2 = 0.2*54 + (1 - 0.2)*44.96 = 46.768$$

$$S_4 = a*y4 + (1 - a)*S3 = 0.2*49 + (1 - 0.2)*46.768 = 47.214$$

After the first weighted average calculation using the formula $S_n = a*y_n + (1-a)*S_{n-1}$, the time offset prediction value at time $T_n$ is: 47.214 ns. When a=0.4, the time offset prediction value at time $T_n$ after the first weighted average calculation is: 48.522 ns, and when a=0.6, the time offset prediction value at time $T_n$ after the first weighted average calculation is: 49.502 ns.

In order to make the data more accurate, the time offset prediction value of the first weighted average calculation is performed the second weighted average calculation according to the formula $S_n' = a*S_n + (1-a)*S_{n-1}'$:

$$S1' = a*S1 + (1 - a)*S0' = 0.2*44.2 + (1 - 0.2)*45.786 = 45.469$$

$$S2' = a*S2 + (1 - a)*S1' = 0.2*44.96 + (1 - 0.2)*45.469 = 45.367$$

$$S3' = a*S3 + (1 - a)*S2' = 0.2*46.768 + (1 - 0.2)*45.367 = 45.647$$

$$S4' = a*S4 + (1 - a)*S3' = 0.2*47.214 + (1 - 0.2)*45.647 = 45.961$$

The time offset prediction value at time $T_n$ after the second weighted average calculation is: 45.961 ns. The details are shown in Table 3:

TABLE 3

| Time | T1 | T2 | T3 | T4 | $T_n$ |
|---|---|---|---|---|---|
| Time offset value | 35 ns | 48 ns | 54 ns | 49 ns | ? |
| Time offset value after the first weighted average calculation | 46.5 | 44.2 | 44.96 | 46.768 | 47.214 |
| Time offset value after the second weighted average calculation | 45.786 | 45.469 | 45.367 | 45.647 | 45.961 |

The frequency offset prediction value is calculated using the same algorithm as above, which will not be described in detail here.

At block 308, current frequency and time of the client are restored according to the time offset prediction value, the frequency offset prediction value and the time $T_c$ when synchronization source is lost.

Specifically, the synchronization source is determined to be lost when the client 1 does not receive synchronization information from the server 2. In a preferred embodiment, when the current synchronization source is not lost but the network signal is very poor, the current frequency and time of the client are restored according to the prediction information.

Specifically, the client 1 restores current frequency and time according to the time offset prediction value, the frequency offset prediction value and the time $T_c$, at the same time sends the time offset prediction value, the frequency offset prediction value and the time $T_c$ to the server 2 with a timestamp.

In the embodiment, by predicting future time offset and frequency offset through historical synchronization information, it can be ensured that the client can still perform synchronization through the predicted time offset and frequency offset to maintain time accuracy when the synchronization source is lost.

The embodiments shown and described above are only examples. Many details are often found in the art such as the other features of synchronization method. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A synchronization method, applied to a client, the method comprising:

periodically acquiring synchronization information between the client and a server;

selecting a preset number of sample data from the synchronization information;

recording time $T_c$ required by a CPU to process the sample data;

predicting a time offset prediction value and a frequency offset prediction value at time $T_n$ by means of substituting the sample data into a preset formula; and restoring a current frequency and time of the client according to the time offset prediction value, the frequency offset prediction value and the time $T_c$ when a synchronization source is lost;

wherein predicting a time offset prediction value and a frequency offset prediction value at time $T_n$ by means of substituting the sample data into a preset formula comprises:

performing a first weighted average calculation on the sample data according to a formula $S_n=a*y_n+(1-a)*S_{n-1}$ to obtain the time offset prediction value and the frequency offset prediction value at the time $T_n$; and performing a second weighted average calculation according to a formula $S_n'=a*S_n+(1-a)*S_{n-1}'$ on the time offset prediction value and the frequency offset prediction value obtained by the first weighted average calculation, and regarding values obtained by the second weighted average calculation as a final time offset prediction value and a final frequency offset prediction value at the time $T_n$, wherein, when the preset formula is calculated for the time offset prediction value, $S_0$ is an average value of time offset values in n sample data, $S_n$ is the time offset prediction value at the time $T_n$ obtained by the first weighted average calculation, in nanoseconds, a is a weighting coefficient value, which is a constant, $y_n$ is a time offset value in the sample data at the time $T_n$, $S_n'$ is the time offset prediction value at the time $T_n$ obtained by the second weighted average calculation, in nanoseconds; and when the preset formula is calculated for the frequency offset prediction value, S0 is an average value of frequency offset values in n sample data, $S_n$ is the frequency offset prediction value at the time $T_n$ obtained by the first weighted average calculation, a is the weighting coefficient value, which is a constant, $y_n$ is a frequency offset value in the sample data at the time $T_n$, $S_n'$ is the frequency offset prediction value at the time $T_n$ obtained by the second weighted average calculation, in nanoseconds.

2. The synchronization method according to claim 1, wherein the method further comprising:

calculating a speed of current frequency changes of the client by applying a linear regression algorithm according to the sample data.

3. The synchronization method according to claim 2, wherein the method further comprising:

selecting a size of the weighting coefficient value a according to the speed of the current frequency changes.

4. The synchronization method according to claim 3, wherein the client comprises a timer, and recording time $T_c$ required by the CPU to process the sample data comprises:

recording the time $T_c$ required by the CPU to process the sample data by means of the timer.

5. The synchronization method according to claim 4, wherein the method further comprising:

when the client does not receive synchronization information from the server, determining the synchronization source is lost.

6. The synchronization method according to claim 4, wherein selecting the preset number of sample data from the synchronization information comprises:

obtaining load information of a CPU of the client, and determining a load level of the CPU according to the load information; and selecting a corresponding amount of sample data according to the load level, wherein different levels correspond to different amounts of sample data.

7. A client, which includes a memory, a processor, and a synchronization program stored in the memory and operable on the processor, wherein the synchronization program is executed by the processor to implement the following functions:

periodically acquiring synchronization information between the client and a server;

selecting a preset number of sample data from the synchronization information;

recording time $T_c$ required by a CPU to process the sample data;

predicting a time offset prediction value and a frequency offset prediction value at time $T_n$ by means of substituting the sample data into a preset formula; and restoring a current frequency and time of the client according to the time offset prediction value, the frequency offset prediction value and the time $T_c$ when a synchronization source is lost;

when predicting a time offset prediction value and a frequency offset prediction value at time $T_n$ by means of substituting the sample data into a preset formula, the synchronization program is further executed by the processor to implement the following functions:

performing a first weighted average calculation on the sample data according to a formula $S_n=a*y_n+(1-a)*S_{n-1}$ to obtain the time offset prediction value and the frequency offset prediction value at the time $T_n$; and performing a second weighted average calculation according to a formula $S_n'=a*S_n+(1-a)*S_{n-1}'$ on the time offset prediction value and the frequency offset prediction value obtained by the first weighted average calculation, and regarding values obtained by the second weighted average calculation as a final time offset prediction value and a final frequency offset prediction value at the time $T_n$, wherein, when the preset formula is calculated for the time offset prediction value, S0 is an average value of time offset values in n sample data, $S_n$ is the time offset prediction value at the time $T_n$ obtained by the first weighted average calculation, in nanoseconds, a is a weighting coefficient value, which is a constant, $y_n$ is a time offset value in the sample data at the time $T_n$, $S_n'$ is the time offset prediction value at the time $T_n$ obtained by the second weighted average calculation, in nanoseconds; and when the preset formula is calculated for the frequency offset prediction value, $S_0$ is an average value of frequency offset values in n sample data, $S_n$ is the frequency offset prediction value at the time $T_n$ obtained by the first weighted average calculation, a is the weighting coefficient value, which is a constant, $y_n$ is a frequency offset value in the sample data at the time $T_n$, $S_n'$ is the frequency offset prediction value at the time $T_n$ obtained by the second weighted average calculation, in nanoseconds.

8. The client according to claim 7, wherein the synchronization program is further executed by the processor to implement the following functions:

calculating a speed of current frequency changes of the client by applying a linear regression algorithm according to the sample data.

9. The client according to claim 8, wherein the synchronization program is further executed by the processor to implement the following functions:

selecting a size of the weighting coefficient value a according to the speed of the current frequency changes.

10. The client according to claim 9, wherein the client further comprises a timer, and when recording time $T_c$ required by the CPU to process the sample data, the synchronization program is further executed by the processor to implement the following functions:

recording the time $T_c$ required by the CPU to process the sample data by means of the timer.

11. The client according to claim 10, wherein the synchronization program is further executed by the processor to implement the following functions:

when the client does not receive synchronization information from the server, determining the synchronization source is lost.

12. The client according to claim 10, wherein when selecting the preset number of sample data from the synchronization information, the synchronization program is further executed by the processor to implement the following functions:

obtaining load information of a CPU of the client, and determining a load level of the CPU according to the load information; and selecting a corresponding amount of sample data according to the load level, wherein different levels correspond to different amounts of sample data.

* * * * *